United States Patent
Takeda et al.

(10) Patent No.: US 11,470,626 B2
(45) Date of Patent: Oct. 11, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 52 days.

(21) Appl. No.: 16/632,478

(22) PCT Filed: Jul. 21, 2017

(86) PCT No.: PCT/JP2017/026517
§ 371 (c)(1),
(2) Date: Jan. 20, 2020

(87) PCT Pub. No.: WO2019/016951
PCT Pub. Date: Jan. 24, 2019

(65) Prior Publication Data
US 2021/0160901 A1   May 27, 2021

(51) Int. Cl.
*H04W 72/12* (2009.01)
*H04W 72/04* (2009.01)

(52) U.S. Cl.
CPC ... *H04W 72/1268* (2013.01); *H04W 72/0413* (2013.01); *H04W 72/0446* (2013.01); *H04W 72/1284* (2013.01)

(58) Field of Classification Search
CPC ......... H04W 72/1268; H04W 72/0413; H04W 72/0446; H04W 72/1284; H04W 72/04; H04W 72/12; H04L 27/26
See application file for complete search history.

(56) References Cited

U.S. PATENT DOCUMENTS

2014/0293947 A1* 10/2014 Nishikawa ........ H04W 72/1257
                                                          370/329
2016/0381674 A1* 12/2016 Kim ...................... H04L 1/189
                                                          370/329
(Continued)

FOREIGN PATENT DOCUMENTS

WO    2013069746 A1    5/2013
WO    WO-2018231728 A1 * 12/2018 ............. H04L 5/001

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Rina C Pancholi
(74) *Attorney, Agent, or Firm* — Osha Bergman Watanabe & Burton LLP

(57) ABSTRACT

Transmission of a plurality of items of UL data and/or a plurality of pieces of UCI having different requirements is appropriately controlled. A user terminal according to the present invention includes: a transmission section that transmits first Uplink Control Information (UCI) and/or first UL data by using a first Uplink (UL) data channel, and/or transmits second UCI and/or second UL data by using a second UL data channel; and a control section that, when at least part of a scheduled duration of the second UL data channel overlaps a transmission timing of the first UCI and/or the first UL data, controls transmission of the first UCI and/or the first UL data.

3 Claims, 15 Drawing Sheets

(56) References Cited

U.S. PATENT DOCUMENTS

2018/0103428 A1* 4/2018 Jiang ............... H04W 72/042
2018/0279291 A1* 9/2018 Tiirola ............... H04B 1/713

OTHER PUBLICATIONS

3GPP TSG RAN WG1 Meeting #86bis; R1-1610048; "sPUSCH for shortened TTI" NTT Docomo, Inc.; Oct. 10-14, 2016; Lisbon, Portugal (8 pages).
3GPP TSG RAN WG1 Meeting #86bis; R1-1609375; "Simultaneous transmission and reception in sTTI" ZTE, ZTE Microelectronics; Oct. 10-14, 2016; Lisbon, Portugal (5 pages).
3GPP TSG RAN WG1 Meeting #85; R1-164544; "Discussion on sPUSCH design with TTI shortening" LG Electronics May 23-27, 2016; Nanjing, China (4 pages).
International Search Report issued in International Application No. PCT/JP2017/026517, dated Aug. 29, 2017 (5 pages).
Written Opinion issued in International Application No. PCT/JP2017/026517; dated Aug. 29, 2017 (4 pages).

* cited by examiner

PIGGYBACK UL DATA FOR URLLC ON PUSCH FOR eMBB

REPLACE UL DATA FOR eMBB WITH UL DATA FOR URLLC ON PUSCH FOR eMBB

▦ PUSCH FOR eMBB
▨ UL DATA FOR URLLC

PIGGYBACK UL DATA AND UCI FOR URLLC ON PUSCH FOR eMBB

PIGGYBACK UCI FOR URLLC ON PUSCH FOR eMBB

REPLACE UL DATA FOR eMBB WITH UL DATA FOR URLLC ON PUSCH FOR Embb

DROP OR PERFORM NON-PIGGYBACK ON UCI FOR eMBB

| | | | |
|---|---|---|---|
|  | PUSCH FOR eMBB |  | UCI FOR eMBB |
|  | UL DATA FOR URLLC |  | UCI FOR URLLC |

UCI FOR URLLC           PUSCH FOR eMBB

UCI FOR eMBB

UCI FOR eMBB      PUSCH FOR URLLC
 UCI FOR URLLC

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE Advanced (LTE-A), Future Radio Access (FRA), 4G, 5G, 5G+(plus), New RAT (NR), and LTE Rel. 14 and 15~) have been also studied.

Furthermore, legacy LTE systems (e.g., LTE Rel. 8 to 13) perform communication on Downlink (DL) and/or Uplink (UL) in a subframe of 1 ms that is a transmission duration (scheduled duration) of one or more Transport Blocks (TBs). The subframe includes 14 symbols of 15 kHz in subcarrier-spacing in a case of, for example, a Normal Cyclic Prefix (NCP). The subframe is also referred to as a Transmission Time Interval (TTI).

Furthermore, the legacy LTE systems schedule a UL data channel (also referred to as, for example, a PUSCH: Physical Uplink Shared Channel or a UL shared channel) of a given timing (also referred to as a timing that is 4 ms after DCI, a scheduling timing or a PUSCH timing) based on Downlink Control Channel (DCI). UL data is transmitted by using a UL data channel.

Furthermore, in the legacy LTE system, Uplink Control Information (UCI) is transmitted from a user terminal to a radio base station. The UCI includes at least one of transmission acknowledgement information (also referred to as, for example, Acknowledgement or Negative ACK (ACK or NACK), A/N, or Hybrid Automatic Repeat reQuest (HARQ)-ACK) for a DL data channel (referred to as, for example, a PDSCH: Physical Downlink Shared Channel or a DL shared channel), Channel State Information (CSI), and a Scheduling Request (SR). The UCI is transmitted by using a UL control channel (e.g., PUCCH: Physical Uplink Control Channel) or the above UL data channel.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., 5G or NR) assume a plurality of use cases of different requirements such as a high speed and a large capacity (e.g., eMBB: enhanced Mobile Broad Band), super multiple terminals (e.g., massive Machine Type Communication (MTC)) and Ultra Reliable and Low Latency (e.g., Ultra Reliable and Low Latency Communications (URLLC)). In addition, names of these use cases are not limited to the above. For example, the URLLC may be referred to as Critical MTC, Ultra-reliable MTC or Mission Critical Communications.

These future radio communication systems assume that a plurality of items of UL data and/or a plurality of pieces of UCI having different requirements are transmitted from an identical user terminal. In this case, it is assumed that at least part of a duration (scheduled duration) in which a UL data channel based on a first requirement (e.g., for eMBB (or for URLLC)) is scheduled and a transmission timing of UL data and/or UCI of a second requirement (e.g., for URLLC (or eMBB)) overlap.

Therefore, the future radio communication systems are desired to appropriately control transmission of a plurality of items of UL data and/or a plurality of pieces of UCI having the different requirements.

The present invention has been made in light of this point, and one of objects of the present invention is to provide a user terminal and a radio communication method that can appropriately control transmission of a plurality of items of UL data and/or a plurality of pieces of UCI having different requirements.

Solution to Problem

One aspect of a user terminal according to the present invention includes: a transmission section that transmits first Uplink Control Information (UCI) and/or first UL data by using a first Uplink (UL) data channel, and/or transmits second UCI and/or second UL data by using a second UL data channel; and a control section that, when at least part of a scheduled duration of the second UL data channel overlaps a transmission timing of the first UCI and/or the first UL data, controls transmission of the first UCI and/or the first UL data.

Advantageous Effects of Invention

According to the present invention, it is possible to appropriately control transmission of a plurality of items of UL data and/or a plurality of pieces of UCI having different requirements.

DESCRIPTION OF EMBODIMENTS

Figure 1A:
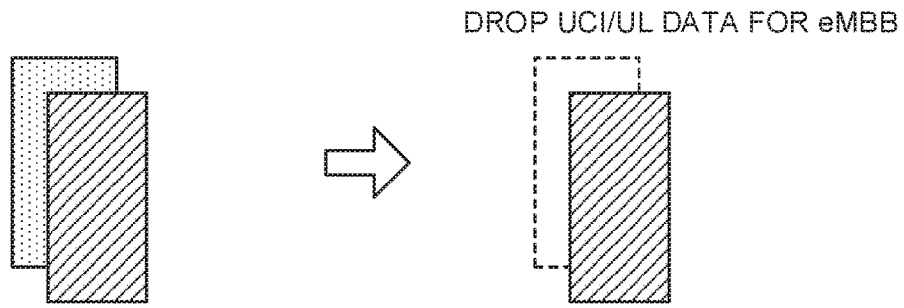
FIGS. 1A to 1C are diagrams illustrating a first example of first collision control according to a first aspect.

A future radio communication system (e.g., 5G or NR) assumes a plurality of uses cases of different requirements such as eMBB, URLLC and massive MTC. For example, eMBB requires at least one of higher performance, higher efficiency and a higher capacity than that of URLLC. On the other hand, URLLC is requested to provide higher reliability and/or lower latency than those of eMBB.

This future radio communication system assumes that a plurality of items of UL data (e.g., UL data for eMBB and UL data for URLLC) and/or a plurality of pieces of UCI (e.g., UCI for eMBB and UCI for URLLC) having different requirements are transmitted from an identical user terminal.

For example, the future radio communication system assumes that at least part of a duration to which a PUSCH for eMBB is scheduled, and a transmission timing of UL data and/or UCI for URLLC overlap. On the contrary, the future radio communication system assumes that at least part of a duration to which a PUSCH for URLLC is scheduled, and a transmission timing of UL data and/or UCI for eMBB overlap, too. In this case, a problem is how to realize both services of eMBB and URLLC for the identical user terminal without undermining requirements for latency reduction and/or reliability of URLLC.

Hence, the inventors of this application have studied a method for appropriately controlling transmission of a plurality of items of UL data and/or a plurality of pieces of UCI having different requirements, and conceived the present invention. More specifically, the inventors of this application have conceived controlling transmission of the UCI and/or the UL data controlled to meet a first requirement when at least part of a scheduled duration of a UL data channel controlled to meet a second requirement (i.e., controlled based on the second requirement) overlaps a transmission timing of UCI and/or UL data controlled to meet the first requirement (i.e., controlled based on the first requirement) (first aspect).

Furthermore, the inventors of this application have conceived controlling the amount and/or transmission power of a resource to be allocated to the UCI based on UCI of which one of the first requirement and the second requirement is piggybacked on a UL data channel of the first requirement or a UL data channel of the second requirement (second aspect).

One embodiment of the present invention will be described in detail below with reference to the drawings. In addition, in the present embodiment, the UL data channel controlled based on the first requirement is, for example, a PUSCH for eMBB (or URLLC), and may be paraphrased as a first UL data channel or a UL data channel based on a first parameter (or a parameter set). Furthermore, the UL data channel controlled based on the second requirement is, for example, a PUSCH for URLLC (or eMBB), and may be paraphrased as a second UL data channel or a UL data channel based on a second parameter (or a parameter set).

Furthermore, the first and second UL data channels are each associated with one or a plurality of Logical Channel Groups (LCGs) by, for example, higher layer signaling, and data corresponding to the above one or plurality of LCGs associated with the UL data channel may be transmitted (data corresponding to an unassociated LCG may not be transmitted) according to which one of the first and second UL data channels is transmitted. Each LCG may be associated with one or both of the first and second UL data channels.

Furthermore, in the present embodiment, UL data and/or UCI controlled based on the first requirement is, for example, UL data and/or UCI for eMBB (or URLLC), and may be paraphrased as first UL data and/or first UCI. Furthermore, UL data and/or UCI controlled based on the second requirement is, for example, UL data and/or UCI for URLLC (or eMBB), and may be paraphrased as second UL data and/or second UCI.

Furthermore, the first and second requirements will be exemplified below. However, the number of requirements is not limited to two, and is optionally applicable to transmission control of a plurality of items of UL data and/or a plurality of pieces of UCI having 3 or more requirements, too. Furthermore, a plurality of items of UL data and/or a plurality of pieces of UCI having different requirements may be transmitted in different durations (e.g., in a slot and a mini slot or with different numbers of symbols) or may be transmitted in an identical duration (e.g., in a mini slot or with an identical number of symbols).

In the present embodiment, UL data for eMBB and/or UL data for URLLC are transmitted on a PUSCH scheduled based on DCI. UL data of which requirement (service) is transmitted on the scheduled PUSCH may be identified based on at least one of (1) DCI itself (e.g., a DCI format and/or a payload) for scheduling the PUSCH, (2) a specific field in the DCI (e.g., 1-bit field is provided to decide which UL data is transmitted based on a value of the 1-bit field), (3) a resource set (CORESET: Control Resource Set) of a DL control channel (e.g., PDCCH: Physical Downlink Control Channel) on which the DCI is detected (e.g., trying monitoring (blind-detection) PDCCHs in a CORESET 1 and a CORESET 2 is configured, and which UL data is transmitted is decided according to which PDCCH included in which CORESET has been detected), and (4) a carrier and/or a band (BWP: bandwidth-part) in which the PUSCH is scheduled (e.g., which UL data is transmitted is decided according to in which one of a plurality of carriers and/or BWPs configured in advance the PUSCH is scheduled).

Furthermore, UCI transmitted by a user terminal may include at least one of (1) an SR for eMBB, (2) an SR for URLLC, (3) HARQ-ACK for a PDSCH for eMBB, (4) HARQ-ACK for a PDSCH for URLLC, (5) CSI for eMBB (a Channel Quality Indicator (CQI) that targets at 10% in Block Error Rate (BLER) and/or information indicating a modulation scheme and/or a code rate (MCS: Modulation and Coding Scheme), and (6) CSI for URLLC (e.g., information indicating a CQI that targets at 0.001% in block error rate and/or the MCS).

(First Aspect)

The first aspect will describe transmission control of UCI and/or UL data (UCI/UL data) in a case where a UL channel and/or a UL signal for eMBB and a UL channel and/or a UL signal for URLLC collide. More specifically, the first aspect will describe transmission control of the UCI and/or the UL data for eMBB (or URLLC) in a case where at least part of a scheduled duration of a PUSCH (second UL data channel) for URLLC (or eMBB) overlaps a transmission timing of the UCI and/or UL data (first UCI and/or first UL data) for eMBB (or URLLC).

<First Collision Control>

When UCI/UL data for eMBB and UCI/UL data for URLLC collide (at least part of these UCI/UL data are scheduled to an overlapping duration), the UCI/UL data for eMBB may be dropped, punctured or cancelled, and the UCI/UL data for URLLC may be transmitted by using a UL channel (e.g., a PUSCH and/or a PUCCH) for URLLC.

<<Collision between PUSCH for URLLC and UCI/UL Data for eMBB>>

When at least part of a scheduled duration of a PUSCH for URLLC overlaps a transmission timing of UCI/UL data for eMBB (the PUSCH for URLLC and the UCI/UL data for eMBB collide), the UCI/UL data for eMBB may be dropped, punctured or cancelled.

Figure 1B:
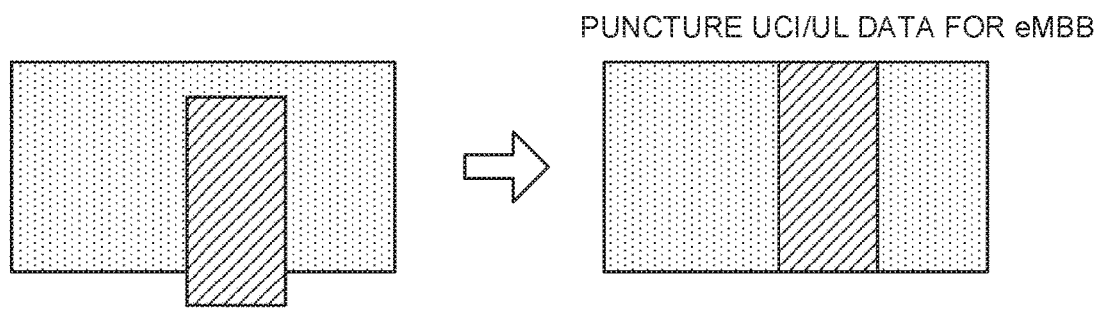
Figure 1C:
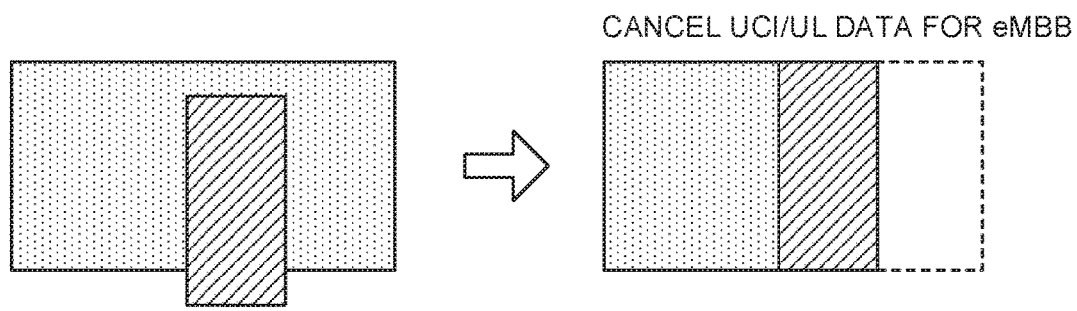

FIG. 1 is a diagram illustrating a first example of first collision control according to the first aspect. As illustrated in FIG. 1A, the UCI/UL data for eMBB may be scheduled to a duration (e.g., mini slot) of an time duration identical to that of the PUSCH for URLLC. Alternatively, as illustrated in FIGS. 1B and 1C, the UCI/UL data for eMBB may be scheduled to a duration (e.g., slot) of a time duration different from that of the PUSCH for URLLC.

When, for example, the PUSCH for URLLC and the UCI/UL data for eMBB collide as illustrated in FIG. 1A, a user terminal may drop the UCI/UL data for eMBB, and transmit UCI/UL data for URLLC by using the PUSCH for URLLC.

Alternatively, when the PUSCH for URLLC and the UCI/UL data for eMBB collide as illustrated in FIG. 1B, the user terminal may puncture the UCI/UL data for eMBB in a scheduled duration of the PUSCH for URLLC, and transmit the UCI/UL data for URLLC by using the PUSCH for URLLC.

Alternatively, when the PUSCH for URLLC and the UCI/UL data for eMBB collide as illustrated in FIG. 1C, the user terminal may cancel transmission of the UCI/UL data for eMBB in or after the scheduled duration of the PUSCH for URLLC, and transmit the UCI/UL data for URLLC by using the PUSCH for URLLC.

<<Collision between PUSCH for URLLC and UCI/UL Data for eMBB>>

When at least part of a scheduled duration of a PUSCH for URLLC overlaps a transmission timing of UCI for URLLC and UCI/UL data for eMBB (the PUSCH and the UCI for URLLC and the UCI/UL data for eMBB collide), the UCI/UL data for eMBB may be dropped, punctured or cancelled, and the UCI for URLLC may be piggybacked on the PUSCH for URLLC.

Figure 2A:
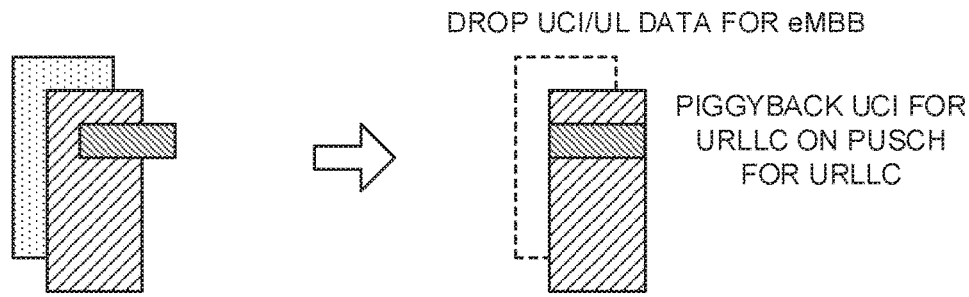
FIGS. 2A to 2C are diagrams illustrating a second example of the first collision control according to the first aspect.

FIG. 2 is a diagram illustrating a second example of first collision control according to the first aspect. Differences from those in FIG. 1 will be mainly described below. When, for example, the PUSCH and the UCI for URLLC and the UCI/UL data for eMBB collide as illustrated in FIG. 2A, the user terminal may drop the UCI/UL data for eMBB, and transmit the UL data for URLLC and the UCI to be piggybacked by using the PUSCH for URLLC.

Figure 2B:
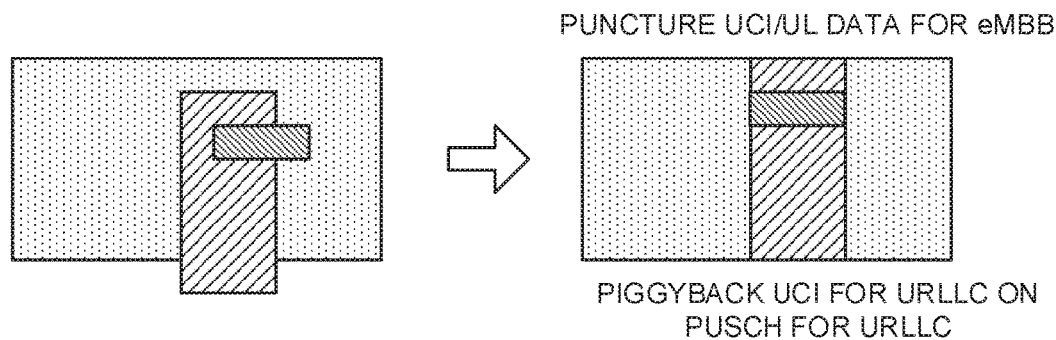

Alternatively, when the PUSCH and the UCI for URLLC and the UCI/UL data for eMBB collide as illustrated in FIG. 2B, the user terminal may puncture the UCI/UL data for eMBB in a scheduled duration of the PUSCH for URLLC, and transmit the UL data for URLLC and the UCI to be piggybacked by using the PUSCH for URLLC.

Figure 2C:
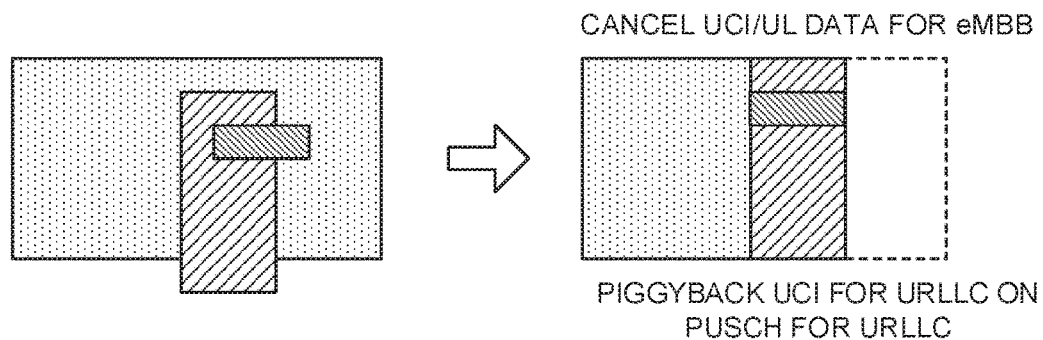

Alternatively, when the PUSCH and the UCI for URLLC and the UCI/UL data for eMBB collide as illustrated in FIG. 2C, the user terminal may cancel transmission of the UCI/UL data for eMBB in or after the scheduled duration of the PUSCH for URLLC, and transmit the UL data for URLLC and the UCI to be piggybacked by using the PUSCH for URLLC.

<<Collision Between UCI for URLLC and UCI/UL Data for eMBB>>

When transmission timings of UCI for URLLC and UCI/UL data for eMBB overlap (collide), the UCI/UL data for eMBB may be dropped, punctured or cancelled, and the UCI for URLLC may be transmitted by using a PUCCH for URLLC.

Figure 3A:
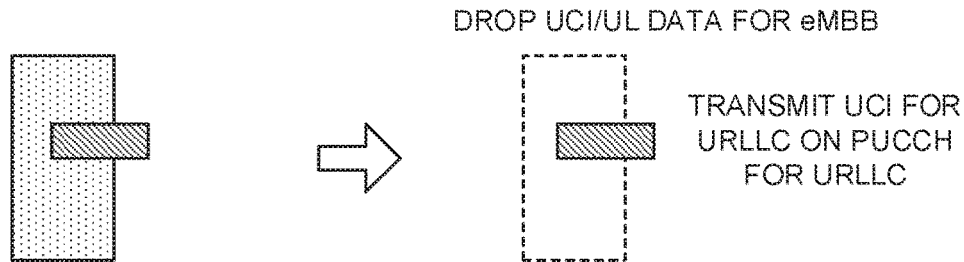
FIGS. 3A to 3C are diagrams illustrating a third example of the first collision control according to the first aspect.

FIG. 3 is a diagram illustrating a third example of the first collision control according to the first aspect. Differences from those in FIG. 1 will be mainly described below. When, for example, the UCI for URLLC and the UCI/UL data for eMBB collide as illustrated in FIG. 3A, the user terminal may drop the UCI/UL data for eMBB, and transmit the UCI for URLLC by using the PUCCH for URLLC.

Figure 3B:
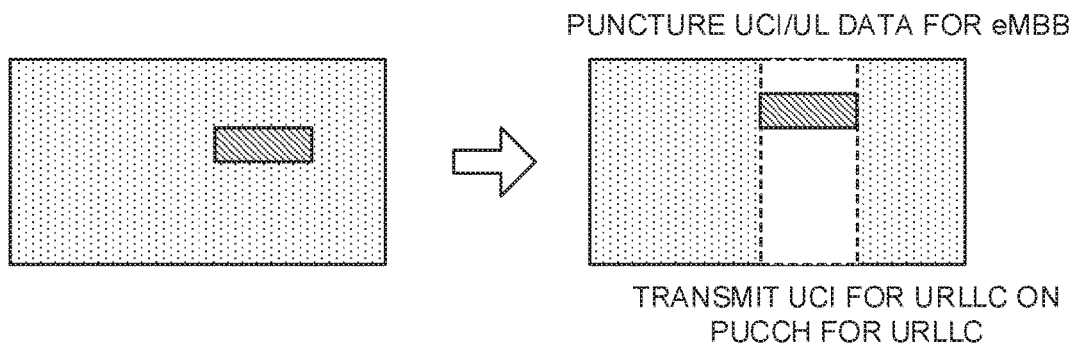

Alternatively, when the UCI for URLLC and the UCI/UL data for eMBB collide as illustrated in FIG. 3B, the user terminal may puncture the UCI/UL data for eMBB in a transmission duration of the PUCCH for URLLC, and transmit the UCI for URLLC by using the PUCCH for URLLC.

Figure 3C:
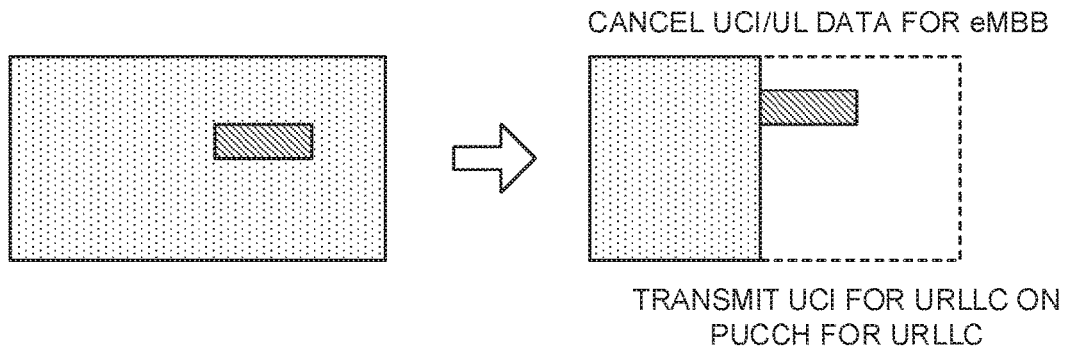

Alternatively, when the UCI for URLLC and the UCI/UL data for eMBB collide as illustrated in FIG. 3C, the user terminal may cancel transmission of the UCI/UL data for eMBB in or after the transmission duration of the PUCCH for URLLC, and transmit the UCI for URLLC by using the PUCCH for URLLC.

According to the first collision control, when the UCI/UL data for eMBB and the UCI/UL data for URLLC collide, the UCI/UL data for eMBB are dropped, and the UCI/UL data for URLLC are transmitted on a UL channel for URLLC, so that it is possible to meet requirements for latency and/or reliability of URLLC.

<Second Collision Control>

When UCI/UL data for eMBB and UCI/UL data for URLLC collide (at least part of these UCI/UL data are scheduled to an overlapping duration), a UL channel (e.g., PUSCH) for eMBB and the UCI/UL data for eMBB and/or URLLC may be carried.

According to second collision control, a PUSCH for eMBB is transmitted based on DCI (UL grant) including scheduling information for eMBB. At least part of an allocation resource for the PUSCH may be used to carry the UCI and/or the UL data for URLLC.

Furthermore, the UCI/UL data for eMBB and the UCI/UL data for URLLC to be transmitted on the PUSCH for eMBB may be separately encoded. Furthermore, the UCI/UL data for eMBB and the UCI/UL data for URLLC may be rate-matched and/or punctured.

Furthermore, according to second collision control, when the UCI/UL data for eMBB are replaced with the UCI/UL data for URLCC on the PUSCH for eMBB, all available resources among allocation resources for the PUSCH may be used to carry the UCI/UL data for URLLC. In this case, the UL data for eMBB may dropped from the PUSCH for eMBB.

<<Collision Between PUSCH for eMBB and UCI for URLLC>>

When at least part of a scheduled duration of a PUSCH for eMBB overlaps a transmission timing of UCI for URLLC (the PUSCH for eMBB and the UCI for URLLC collide), the UCI for URLLC may be piggybacked on the PUSCH for eMBB. In addition, transmitting (piggybacking) UCI of a certain requirement on a PUSCH of a different requirement will be also referred to as "redirect".

Figure 4:
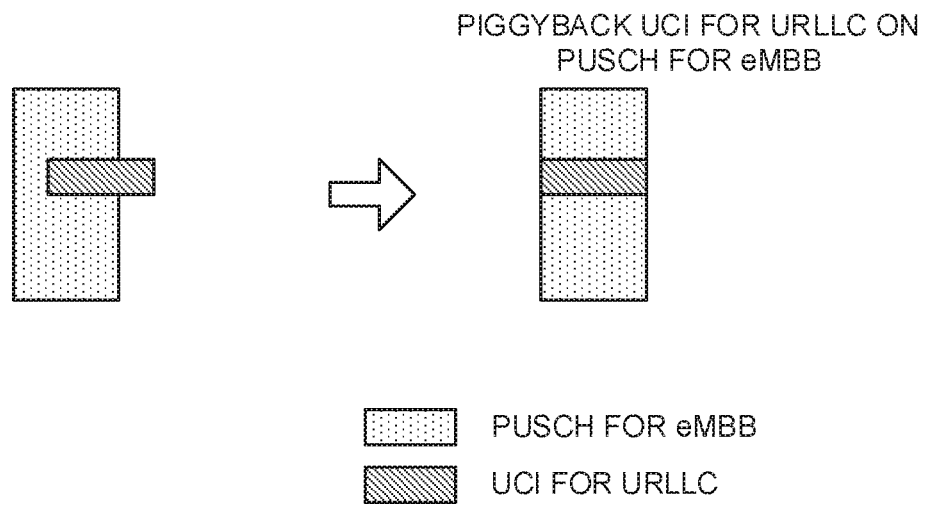
FIG. 4 is a diagram illustrating a first example of second collision control according to the first aspect.

FIG. 4 is a diagram illustrating a first example of second collision control according to the first aspect. In addition, the PUSCH for eMBB may be scheduled to a duration (e.g., a slot or a mini slot) of an identical or different time duration to or from that of a PUSCH for URLLC.

When, for example, the PUSCH for eMBB and the UCI for URLLC collide as illustrated in FIG. 4, the user terminal may transmit at least the UCI for URLLC by using the PUSCH for eMBB. Furthermore, the user terminal may control transmission (or dropping or cancelling) of UL data for eMBB that uses the PUSCH for eMBB based on a code rate that is applicable to the UCI for URLLC to be piggybacked on the PUSCH for eMBB.

When the code rate is a given threshold or less, the user terminal may transmit the UCI for URLLC and the UL data for eMBB by using the PUSCH for eMBB. On the other hand, when the code rate is larger than a given threshold, the user terminal may drop at least part of the UL data for eMBB or cancel transmission of the UL data for eMBB.

<<Collision Between PUSCH for eMBB and UL Data for URLLC>>

When at least part of a scheduled duration of a PUSCH for eMBB overlaps a transmission timing of UCI for URLLC (the PUSCH for eMBB and UL data for URLLC collide), the UL data for URLLC may be piggybacked on the PUSCH for eMBB or may be replaced with UL data for eMBB.

Furthermore, when a code rate of the UCI for URLLC to be transmitted on the PUSCH for eMBB does not meet a given condition (e.g., a sufficiently low code rate cannot be achieved), at least part of the UL data for eMBB may be dropped or cancelled.

Figure 5A:
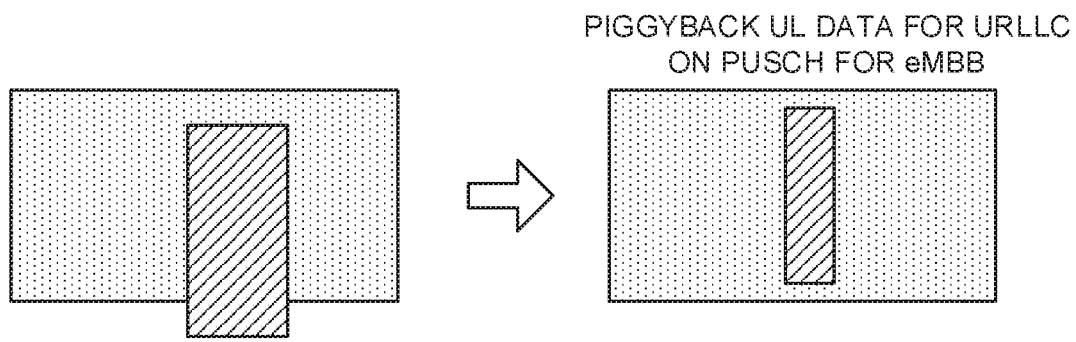
FIGS. 5A and 5B are diagrams illustrating a second example of the second collision control according to the first aspect.

FIG. 5 is a diagram illustrating a second example of second collision control according to the first aspect. Differences from those in FIG. 4 will be mainly described below. When, for example, the PUSCH for eMBB and the UL data for URLLC collide as illustrated in FIG. 5A, the user terminal may transmit at least the UL data for URLLC by using the PUSCH for eMBB.

Furthermore, the user terminal may control transmission of the UL data for eMBB that uses the PUSCH for eMBB based on the code rate that is applicable to the UL data for URLLC. When the code rate is the given threshold or less, the user terminal may transmit the UL data for URLLC and the UL data for eMBB by using the PUSCH for eMBB. On the other hand, when the code rate is larger than the given threshold, the user terminal may drop at least part of the UL data for eMBB or cancel transmission of the UL data for eMBB.

Figure 5B:
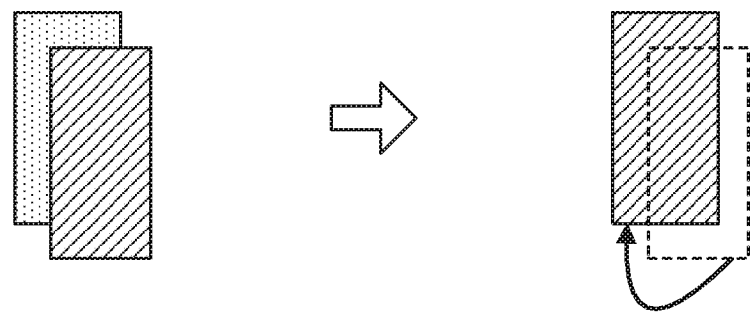

Alternatively, when the PUSCH for eMBB and the UL data for URLLC collide as illustrated in FIG. 5B, the user terminal may replace the UL data for eMBB with the UL data for URLLC on the PUSCH for eMBB. In this case, the user terminal may transmit the UL data for URLLC by using the PUSCH for eMBB, and, on the other hand, may not transmit the UL data for eMBB.

<<Collision Between PUSCH and UCI for eMBB and UL Data and UCI for URLLC>>

When at least part of a scheduled duration of a PUSCH for eMBB overlaps a transmission timing of UCI for eMBB and UL data and UCI for URLLC (when UL data and the UCI for eMBB and the UL data and the UCI for URLLC collide), the UL data for URLLC may be piggybacked on the PUSCH for eMBB or replaced with the UL data for eMBB. The UCI for URLLC may be piggybacked on the PUSCH for eMBB.

Furthermore, when a code rate of the UCI and the UL data for URLLC to be transmitted on the PUSCH for eMBB does not meet a given condition (e.g., a sufficiently low code rate cannot be achieved), at least part of the UL data for eMBB may be dropped or cancelled. In this case, at least part of the UCI for eMBB may be dropped or may not be piggybacked on the PUSCH for eMBB.

FIG. 6 is a diagram illustrating a third example of the second collision control according to the first aspect. Differences from those in FIG. 4 will be mainly described below. When, for example, the PUSCH and the UCI for eMBB and the UL data and the UCI for URLLC collide as illustrated in FIG. 6A, the user terminal may transmit the UL data and the UCI for URLLC to be piggybacked on the PUSCH for eMBB.

Furthermore, the user terminal may control transmission of the UL data/UCI for eMBB that uses the PUSCH for eMBB based on a code rate that is applicable to the UL data/UCI for URLLC. More specifically, when the code rate is larger than the given threshold, the user terminal may drop at least part of the UL data for eMBB or cancel transmission of the UL data for eMBB. Furthermore, when the code rate is larger than the given threshold, the user terminal may drop at least part of the UCI for eMBB or perform non-piggyback (may not perform piggyback) on the PUSCH for eMBB.

Figure 6A:
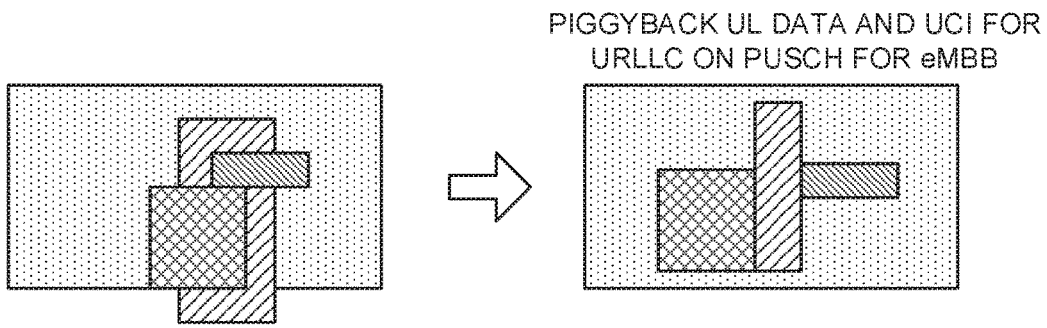
FIGS. 6A and 6B are diagrams illustrating the second example of the second collision control according to the first aspect.

When, for example, the code rate that is applicable to the UL data/UCI for URLLC to be transmitted on the PUSCH for eMBB is a given threshold or less in FIG. 6A, the user terminal transmits the UL data and the UCI for URLLC and, in addition, the UL data and the UCI for eMBB by using the PUSCH for eMBB.

Figure 6B:
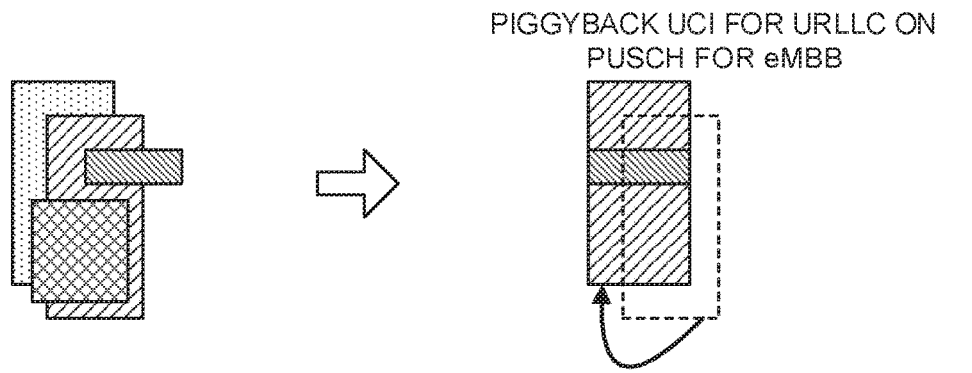
Figure 6B:
Figure 6B:
Figure 6B:
Figure 6B:

Alternatively, when the PUSCH and the UCI for eMBB and the UL data and the UCI for URLLC collide as illustrated in FIG. 6B, the user terminal may piggyback the UCI for URLLC on the PUSCH for eMBB, and replace the UL data for eMBB on the PUSCH for eMBB with the UL data for URLLC.

Furthermore, the user terminal may control transmission of the UCI for eMBB that uses the PUSCH for eMBB based on the code rate that is applicable to the UL data and/or the UCI for URLLC. More specifically, when the code rate is larger than the given threshold, the user terminal may drop at least part of the UCI for eMBB or may perform non-piggyback (may not perform piggyback) on the PUSCH for eMBB.

According to second collision control, when the UCI/UL data for eMBB and the UCI/UL data for URLLC collide, at least the UCI/UL data for URLLC are transmitted on the UL channel for eMBB, so that it is possible to meet requirements for latency and/or reliability of URLLC.

<Third Collision Control>

When UCI/UL data for eMBB and UCI/UL data for URLLC collide (at least part of the UCI/UL data are scheduled to at an overlapping duration), a UL channel (e.g., a PUSCH and/or a PUCCH) for URLLC may carry the UCI/UL data for eMBB and/or the UCI/UL data for URLLC.

<<Collision Between PUSCH for URLLC and UCI for eMBB>>

When at least part of a scheduled duration of a PUSCH for URLLC overlaps a transmission timing of UCI for eMBB (the PUSCH for URLLC and the UCI for eMBB collide), the UCI for eMBB may be piggybacked on the PUSCH for URLLC.

FIG. 7 is a diagram illustrating one example of third collision control according to the first aspect. In this regard, differences from those in FIG. 1 will be mainly described. When, for example, the UL data for URLLC and the UCI for eMBB collide as illustrated in FIG. 7A, the user terminal may transmit the UCI for eMBB by using the PUSCH for URLLC (the UCI for eMBB may be piggybacked on the PUSCH for URLLC).

Furthermore, the user terminal may control transmission of the UCI for eMBB that uses the PUSCH for URLLC based on a code rate that is applicable to the UL data for URLLC. More specifically, when the code rate is a given threshold or less, the user terminal may transmit the UCI for eMBB and the UL data for URLLC by using the PUSCH for URLLC. When the code rate is larger than the given threshold, the user terminal may drop at least part of the UCI for eMBB or perform non-piggyback (may not perform piggyback) on the PUSCH for URLLC.

<<Collision Between PUSCH and UCI for URLLC and UCI for eMBB>>

Figure 7A:
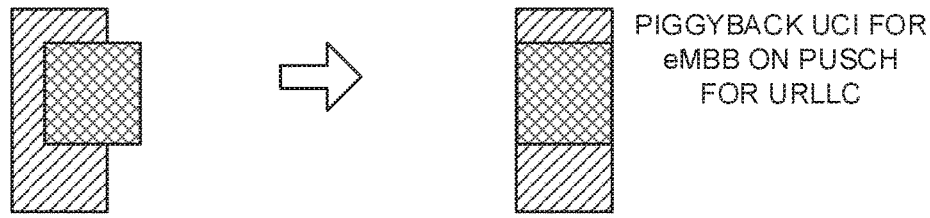
FIGS. 7A to 7D are diagrams illustrating one example of third collision control according to the first aspect.
Figure 7B:
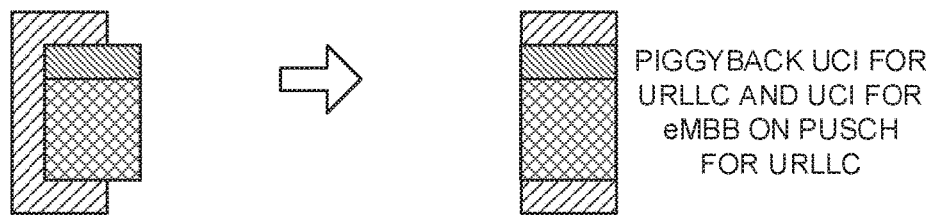

When a PUSCH and UCI for URLLC and UCI for eMBB collide as illustrated in FIG. 7B, the user terminal may transmit the UCI for URLLC and the UCI for eMBB by using the PUSCH for URLLC (the UCI for URLLC and the UCI for eMBB may be piggybacked on the PUSCH for URLLC).

Furthermore, the user terminal may control transmission of the UCI for eMBB that uses the PUSCH for URLLC based on a code rate that is applicable to UL data for URLLC. More specifically, when the code rate is larger than a given threshold, the user terminal may drop at least part of the UCI for eMBB or may perform non-piggyback (may not perform piggyback) on the PUSCH for URLLC.

<<Collision Between UCI for URLLC and UL Data for eMBB>>

Figure 7C:
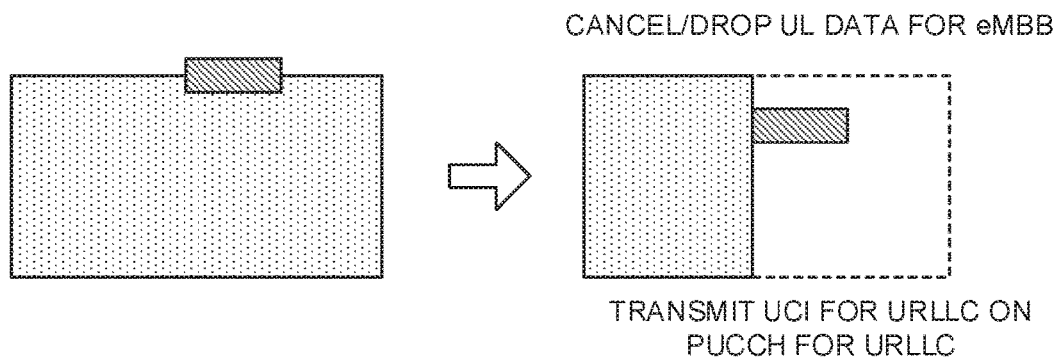

When UCI for URLLC and UL data for eMBB collide as illustrated in FIG. 7C, the user terminal may transmit the UCI for URLLC by using a PUCCH for URLLC, and drop at least part of the UL data for eMBB or cancel transmission of at least part of the UL data.

<<Collision Between UCI for URLLC and UL Data and UCI for eMBB>>

Figure 7D:
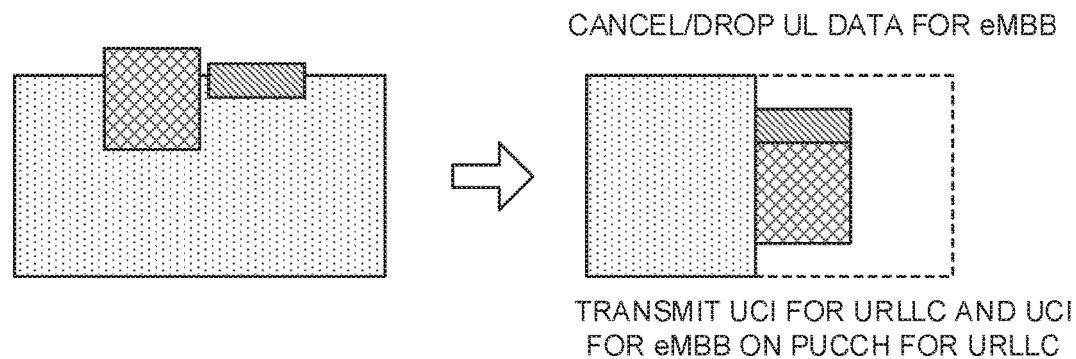

When UCI for URLLC and UL data and UCI for eMBB collide as illustrated in FIG. 7D, the user terminal may transmit the UCI for URLLC by using a PUCCH for URLLC, and may drop at least part of the UL data for eMBB or cancel transmission of at least part of the UL data. When the given condition is met, the user terminal may transmit the UCI for eMBB by using the PUSCH for URLLC (may multiplex the UCI for eMBB on the PUCCH for URLLC).

According to third collision control, when the UCI/UL data for eMBB and the UCI/UL data for URLLC collide, at least the UCI/UL data for URLLC are transmitted on a UL channel for URLLC, so that it is possible to meet requirements for latency and/or reliability of URLLC.

As described above, according to the first aspect, even when the UCI/UL data for eMBB and the UCI/UL data for URLLC collide, it is possible to appropriately control transmission of the UCI/UL data for eMBB and/or the UCI/UL data for URLLC.

(Second Aspect)

According to the second aspect, the amount and/or transmission power of a resource to be allocated to UCI are controlled based on which one of pieces of UCI for eMBB and URLLC is piggybacked on a PUSCH for eMBB or a PUSCH for URLLC.

According to the second aspect, a plurality of parameter sets for piggyback may be configured from a radio base station to a user terminal by higher layer signaling. Each parameter set includes one or more parameters. For example, each parameter set may include a parameter (resource parameter) used to determine an allocation resource for UCI to be piggybacked, and/or a parameter (code rate parameter) used to determine a code rate of the UCI, and/or a parameter (transmission power parameter) used to determine transmission power of the UCI.

<Piggyback on PUSCH for eMBB>

FIG. 8 is a diagram illustrating one example of piggyback on a PUSCH for eMBB according to the second aspect. FIG. 8A illustrates one example where UCI for eMBB is piggybacked on the PUSCH for eMBB. On the other hand, FIG. 8B illustrates one example where UCI for URLLC is piggybacked on the PUSCH for eMBB.

Figure 8A:
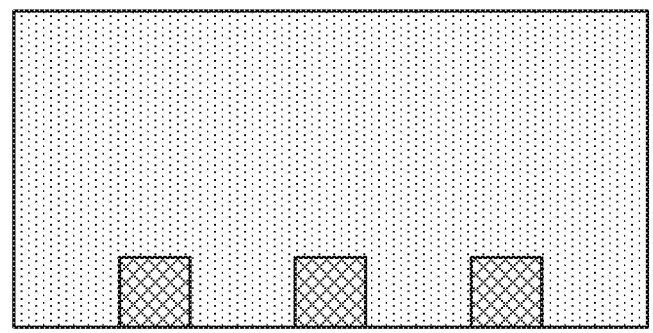
FIGS. 8A and 8B are diagrams illustrating one example of piggyback on a PUSCH for eMBB according to a second aspect.

When UCI for eMBB is piggybacked on the PUSCH for eMBB as illustrated in FIG. 8A, the user terminal may determine an allocation resource and/or transmission power for the UCI for eMBB based on a first parameter set.

Figure 8B:
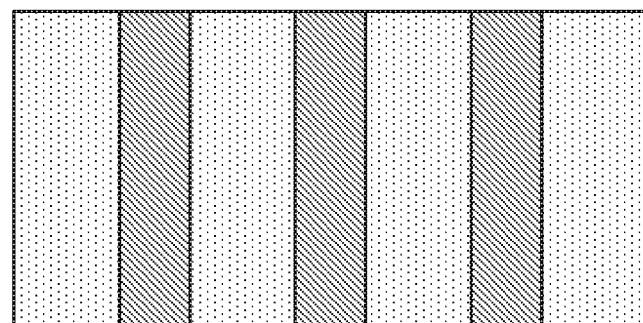
Figure 8B:
Figure 8B:
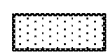
Figure 8B:

On the other hand, when the UCI for URLLC is piggybacked on the PUSCH for eMBB as illustrated in FIG. 8B, the user terminal may determine the allocation resource and/or the transmission power for the UCI for eMBB based on a second parameter set.

As illustrated in, for example, FIG. 8B, the user terminal may determine a greater amount of resources than that of the UCI for eMBB (FIG. 8A) for the UCI for URLLC based on the second parameter set. Furthermore, the user terminal may determine larger transmission power than that of the UCI for eMBB (FIG. 8A) for the UCI for URLLC based on the second parameter set.

That is, the above resource parameter and/or transmission power parameter in the second parameter set used in FIG. 8B may be configured larger than the above resource parameter and/or transmission power parameter in the first parameter set in FIG. 8A.

In addition, when the allocation resource for the UCI for URLLC meets a given condition in FIG. 8B (when, for example, a larger allocation resource than the given threshold is determined), at least part of the allocation resource for the UL data for eMBB may be allocated to the UCI for URLLC.

<Piggyback on PUSCH for URLLC>

FIG. 9 is a diagram illustrating one example of piggyback on a PUSCH for URLLC according to the second aspect. FIG. 9A illustrates one example where UCI for eMBB is piggybacked on the PUSCH for URLLC. On the other hand, FIG. 9B illustrates one example where UCI for URLLC is piggybacked on the PUSCH for URLLC.

Figure 9A:
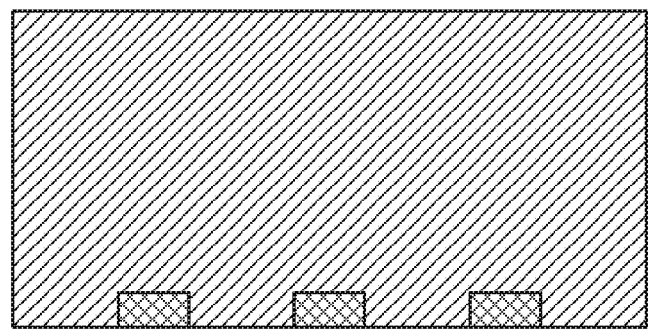
FIGS. 9A and 9B are diagrams illustrating one example of piggyback on a PUSCH for URLLC according to the second aspect.

When the UCI for eMBB is piggybacked on the PUSCH for URLLC as illustrated in FIG. 9A, the user terminal may determine an allocation resource and/or transmission power for the UCI for eMBB based on the first parameter set.

Figure 9B:
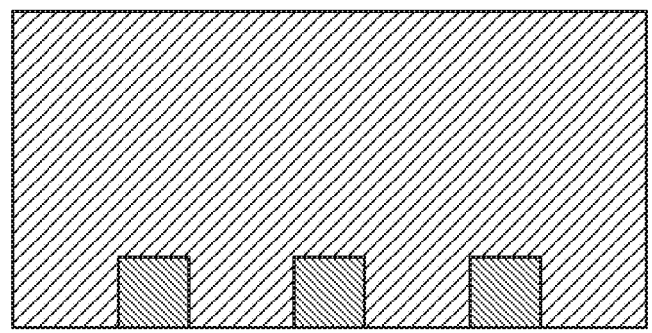
Figure 9B:
Figure 9B:
Figure 9B:

On the other hand, when the UCI for URLLC is piggybacked on the PUSCH for URLLC as illustrated in FIG. 9B, the user terminal may determine an allocation resource and/or transmission power for the UCI for URLLC based on the second parameter set.

As illustrated in, for example, FIG. 9B, the user terminal may determine a larger amount of resources than that of the UCI for eMBB (FIG. 9A) for the UCI for URLLC based on the second parameter set. Furthermore, the user terminal may determine larger transmission power than that of the UCI for eMBB (FIG. 9A) for the UCI for URLLC based on the second parameter set.

That is, the above resource parameter set and/or transmission power parameter in the second parameter set used in FIG. 9B may be configured larger than the above resource parameter and/or transmission power parameter in the first parameter set in FIG. 9A.

<Priority>

When at least one of UCI and UL data for URLLC and UCI and UL data for eMBB collide on a PUSCH for eMBB or a PUSCH for URLLC, the user terminal may control an allocation resource and/or transmission power based on a given priority.

For example, the given priority may be the UCI for URLLC>the UL data for URLLC>the UCI for eMBB>the UL data for eMBB. Furthermore, the given priority may be determined based on a UCI type (e.g., at least one of an SR, HARQ-ACK and CSI).

As described above, according to the second aspect, when piggyback is performed on a PUSCH for eMBB or a PUSCH for URLLC, it is possible to appropriately control a transmission resource and/or transmission power of UCI to be piggybacked.

(Other Aspect)

The first and second aspects have described a PUSCH (e.g., a PUSCH for eMBB or a PUSCH for URLLC) to be transmitted based on a UL grant in a single carrier (also referred to as a Component Carrier (CC) or a cell).

However, the first and/or second aspects are not limited to the PUSCH based on the UL grant, and are optionally applicable to a PUSCH (a UL grant-free PUSCH) to be transmitted without the UL grant.

Furthermore, the first and/or second aspects have described piggyback on the PUSCH to be transmitted on a single carrier. However, in a case of Carrier Aggregation (CA) that aggregates a plurality of carriers (also referred to as Component Carriers (CCs) or cells), piggyback may be performed on PUSCHs of other carriers.

When there are a plurality of carriers that can transmit a PUSCH, (1) UCI may be piggybacked on a PUSCH to be scheduled by a UL grant in a carrier of a minimum index number. Alternatively, (2) the UCI may be piggybacked on the PUSCH to be transmitted without being based on the UL grant in the carrier of the minimum index number. Alternatively, (3) the UCI may be piggybacked on the PUSCH to be transmitted in the carrier of the minimum index number.

(Radio Communication System)

The configuration of the radio communication system according to the present embodiment will be described below. This radio communication system is applied the radio communication method according to each of the above aspects. In addition, the radio communication method according to each of the above aspects may be each applied alone or may be applied in combination.

Figure 10:
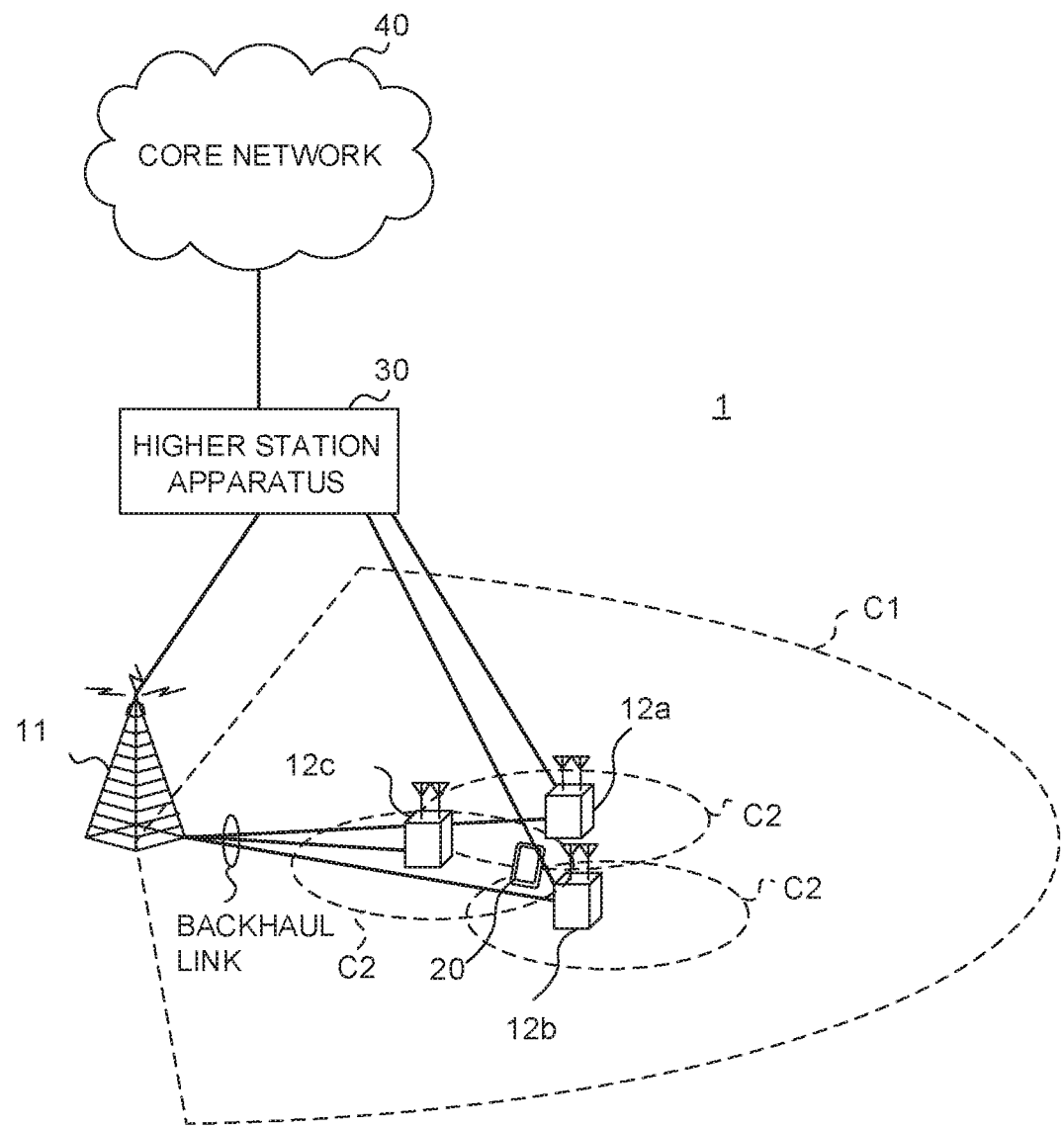
FIG. 10 is a diagram illustrating one example of a schematic configuration of a radio communication system according to the present embodiment.

FIG. 10 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) or New-RAT (NR).

The radio communication system 1 illustrated in FIG. 10 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells. In this regard, the numerology may be at least one of a subcarrier-spacing, a symbol length, a Cyclic Prefix (CP) length, the number of symbols per Transmission Time Interval (TTI) and a time duration of the TTI. Furthermore, the slot may be a time unit based on the numerology applied by the user terminal. The number of symbols per slot may be determined according to a subcarrier-spacing.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two or more CCs). Furthermore, the user terminal can use licensed band CCs and unlicensed band CCs as a plurality of cells.

Furthermore, the user terminal 20 can communicate by using Time Division Duplex (TDD) or Frequency Division Duplex (FDD) in each cell. A TDD cell and an FDD cell may be each referred to as a TDD carrier (frame configuration second type) and an FDD carrier (frame configuration first type).

Furthermore, each cell (carrier) may be applied a slot (also referred to as a TTI, a general TTI, a long TTI, a general subframe, a long subframe or a subframe) having a relatively long time duration (e.g., 1 ms), and/or a slot (also referred to as a mini slot, a short TTI or a short subframe) having a relatively short time duration. Furthermore, in each cell, a slot of 2 or more time durations may be applied.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal but also a fixed communication terminal. Furthermore, the user terminal 20 can perform Device-to-Device communication (D2D) with the other user terminal 20.

The radio communication system 1 applies Orthogonal Frequency-Division Multiple Access (OFDMA) to downlink (DL) and Single Carrier-Frequency Division Multiple Access (SC-FDMA) to uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL. Furthermore, SC-FDMA is applicable to Sidelink (SL) used for device-to-device communication.

The radio communication system 1 uses a DL data channel (also referred to as a PDSCH: Physical Downlink Shared Channel or a DL shared channel) shared by each user terminal 20, a broadcast channel (PBCH: Physical Broadcast Channel) and an L1/L2 control channel as DL channels. DL data (at least one of user data, higher layer control information and System Information Blocks (SIBs)) is carried on the PDSCH. Furthermore, Master Information Blocks (MIBs) are carried on the PBCH.

The L1/L2 control channel includes a DL control channel (e.g., a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is carried on the PDCCH. The number of OFDM symbols used for the PDCCH is carried on the PCFICH. The EPDCCH is subjected to frequency division multiplexing with the PDSCH and is used to carry DCI similar to the PDCCH. Transmission acknowledgement information (also referred to as, for example, A/N, HARQ-ACK, HARQ-ACK bits or an A/N codebook) for the PUSCH can be carried on the PHICH.

The radio communication system 1 uses a UL data channel (also referred to as a PUSCH: Physical Uplink Shared Channel or a UL shared channel) shared by each user terminal 20, a UL control channel (PUCCH: Physical Uplink Control Channel), and a random access channel (PRACH: Physical Random Access Channel) as UL channels. UL data (user data and/or higher layer control information) is carried on the PUSCH. Uplink Control Information (UCI) including at least one of transmission acknowledgement information (A/N or HARQ-ACK) and Channel State Information (CSI) of the PDSCH is carried on the PUSCH or the PUCCH. A random access preamble for establishing connection with a cell can be carried on the PRACH.

<Radio Base Station>

Figure 11:
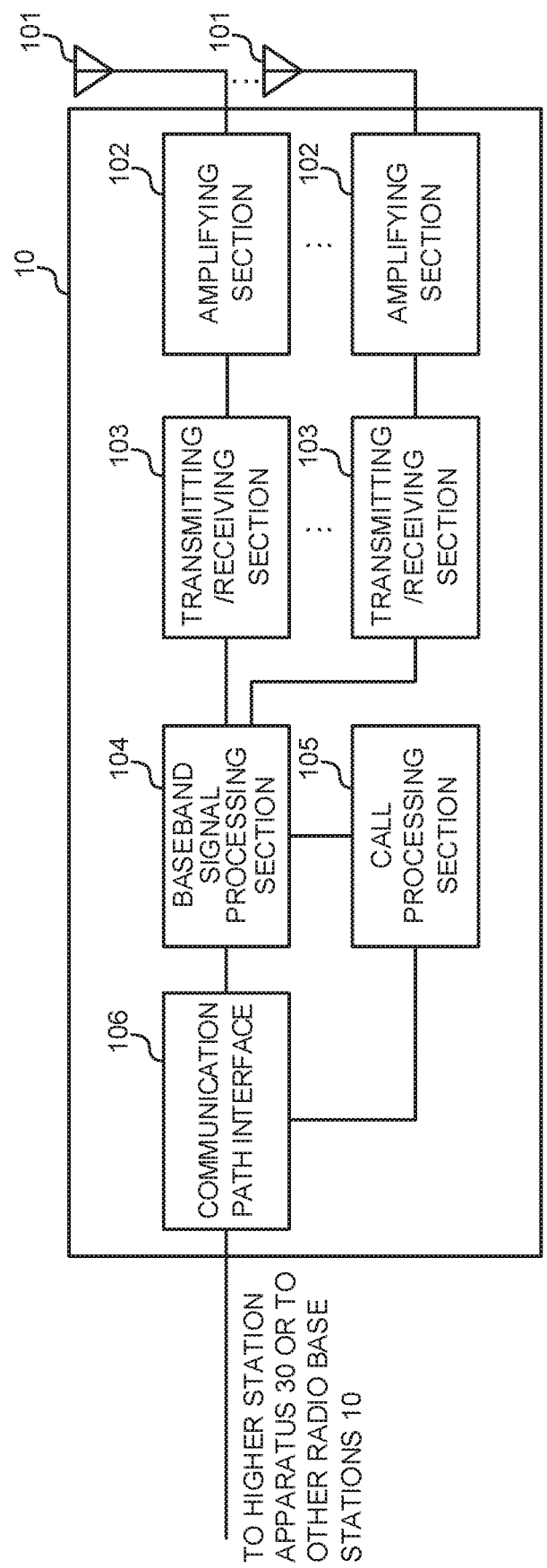
FIG. 11 is a diagram illustrating one example of an overall configuration of a radio base station according to the present embodiment.

FIG. 11 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103. The radio base station 10 may compose a "reception apparatus" on UL, and compose a "transmission apparatus" on DL.

DL data transmitted from the radio base station 10 to the user terminal 20 on DL is input from the higher station apparatus 30 to the baseband signal processing section 104 via the channel interface 106.

The baseband signal processing section 104 performs processing of a Packet Data Convergence Protocol (PDCP) layer, segmentation and concatenation of the DL data, transmission processing of a Radio Link Control (RLC) layer such as RLC retransmission control, Medium Access Control (MAC) retransmission control (e.g., Hybrid Automatic Repeat reQuest (HARM) processing), and transmission processing such as at least one of scheduling, transmission format selection, channel coding, rate matching, scrambling, Inverse Fast Fourier Transform (IFFT) processing, and precoding processing on the DL data signal, and transfers the DL data signal to each transmission/reception section 103. Furthermore, the baseband signal processing section 104 performs transmission processing such as channel coding and/or inverse fast Fourier transform on a DL control signal, too, and transfers the DL control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as a UL signal. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the channel interface 106. The call processing section 105 performs at least one of call processing such as configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmission/reception section 103 transmits a DL signal (e.g., at least one of a DL control signal (also referred to as a DL control channel or DCI), a DL data signal (also referred to as a DL data channel or DL data) and a reference signal). Furthermore, each transmission/reception section 103 receives a UL signal (e.g., at least one of a UL control signal (also referred to as a UL control channel or UCI), a UL data signal (also referred to as a UL data channel or UL data) and a reference signal).

Furthermore, each transmission/reception section 103 may receive first UCI and/or first UL data (e.g., UCI/UL data for eMBB (or URLLC)) by using a first UL data channel (e.g., a PUSCH for eMBB (or URLLC)), and/or receive second UCI and/or second UL data (e.g., UCI/UL data for URLLC (or eMBB)) by using a second UL data channel (e.g., a PUSCH for URLLC (or eMBB)).

Figure 12:
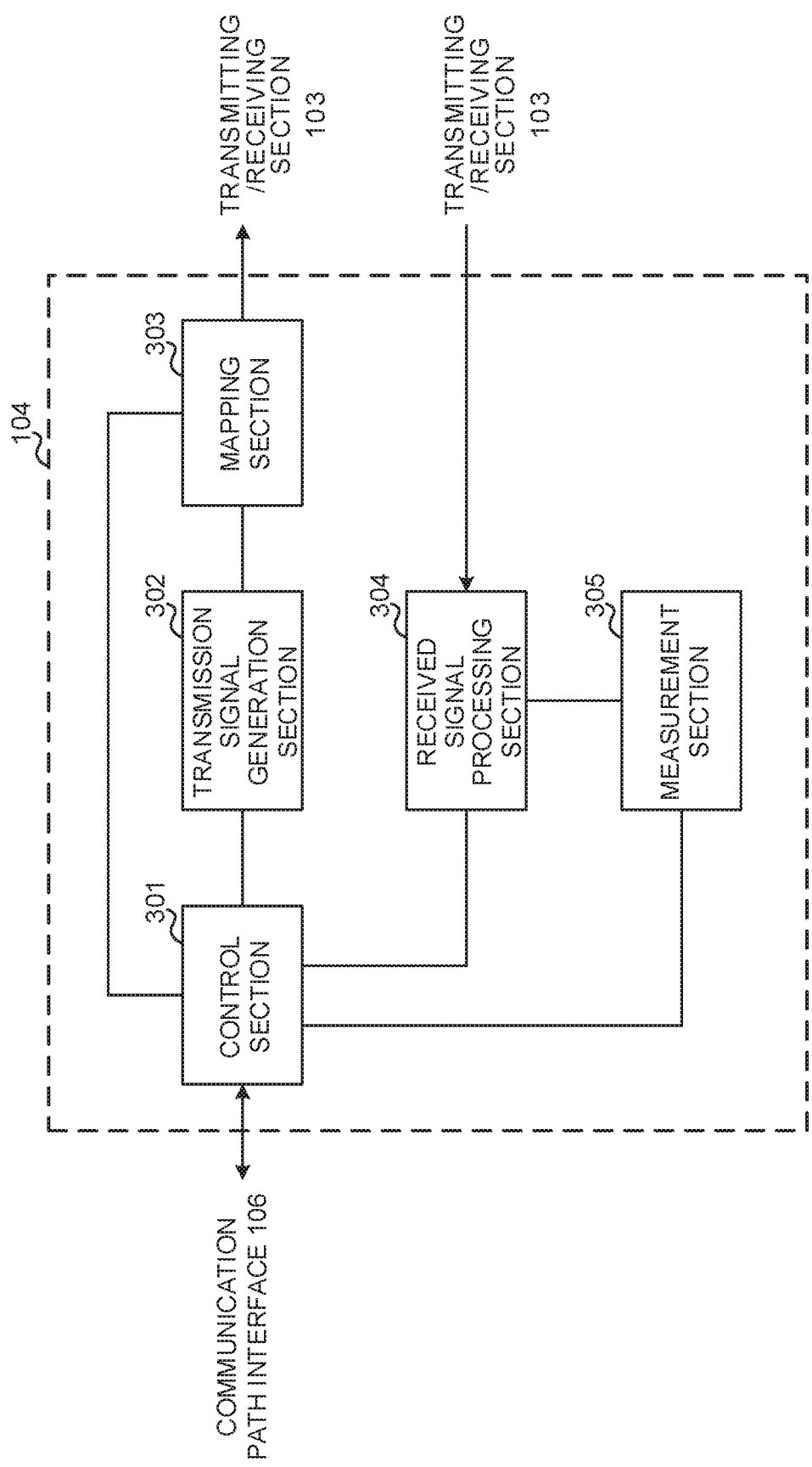
FIG. 12 is a diagram illustrating one example of a function configuration of the radio base station according to the present embodiment.

FIG. 12 is a diagram illustrating one example of a function configuration of the radio base station according to the present embodiment. In addition, FIG. 12 mainly illustrates function blocks of characteristic portions according to the present embodiment, and assumes that the radio base station 10 includes other function blocks, too, that are necessary for radio communication. As illustrated in FIG. 12, the baseband signal processing section 104 includes a control section 301, a transmission signal generating section 302, a mapping section 303, a received signal processing section 304 and a measurement section 305.

The control section 301 controls the entire radio base station 10. The control section 301 controls at least one of, for example, DL signal generation of the transmission signal generating section 302, DL signal mapping of the mapping section 303, UL signal reception processing (e.g., demodulation) of the received signal processing section 304, and measurement of the measurement section 305.

Furthermore, the control section 301 may control scheduling of a data signal (including a DL data signal and/or a UL data signal). More specifically, the control section 301 may control generation and/or transmission of one or more pieces of DCI used for scheduling of the first UL data channel (e.g., the PUSCH for eMBB (or URLLC)) and/or the second UL data channel (e.g., the PUSCH for URLLC (or eMBB)).

Furthermore, the control section 301 may control reception of the first UCI and/or the first UL data (e.g., UCI/UL data for eMBB (or URLLC)) and/or the second UCI and/or the second UL data (e.g., UCI/UL data for URLLC (or eMBB)).

Furthermore, when at least part of a scheduled duration of the second UL data channel overlaps a transmission timing of the first UCI and/or the first UL data, the control section 301 may control reception of the first UCI and/or the first UL data (first aspect).

Furthermore, the control section 301 may control generation and/or transmission of each parameter set used to control an amount and/or transmission power of a resource to be allocated to the first UCI or the second UCI (second aspect). Each parameter set may be notified to the user terminal 20 by higher layer signaling and/or physical layer signaling (e.g., DCI).

The control section 301 can be composed of a controller, a control circuit or a control apparatus described based on the common knowledge in the technical field according to the present invention.

The transmission signal generating section 302 may generate the above DL signal based on an instruction from the control section 301, and output the DL signal to the mapping section 303. The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on a given radio resource based on the instruction from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal transmitted from the user terminal 20. The received signal processing section 304 can be composed of a signal processor, a signal processing circuit or a signal processing apparatus described based on the common knowledge in the technical field according to the present invention. Furthermore, the received signal processing section 304 can compose the reception section according to the present invention.

The measurement section 305 may measure UL channel quality based on, for example, received power (e.g., Reference Signal Received Power (RSRP)) and/or received quality (e.g., Reference Signal Received Quality (RSRQ)) of the reference signal. The measurement section 305 may output a measurement result to the control section 301.

<User Terminal>

Figure 13:
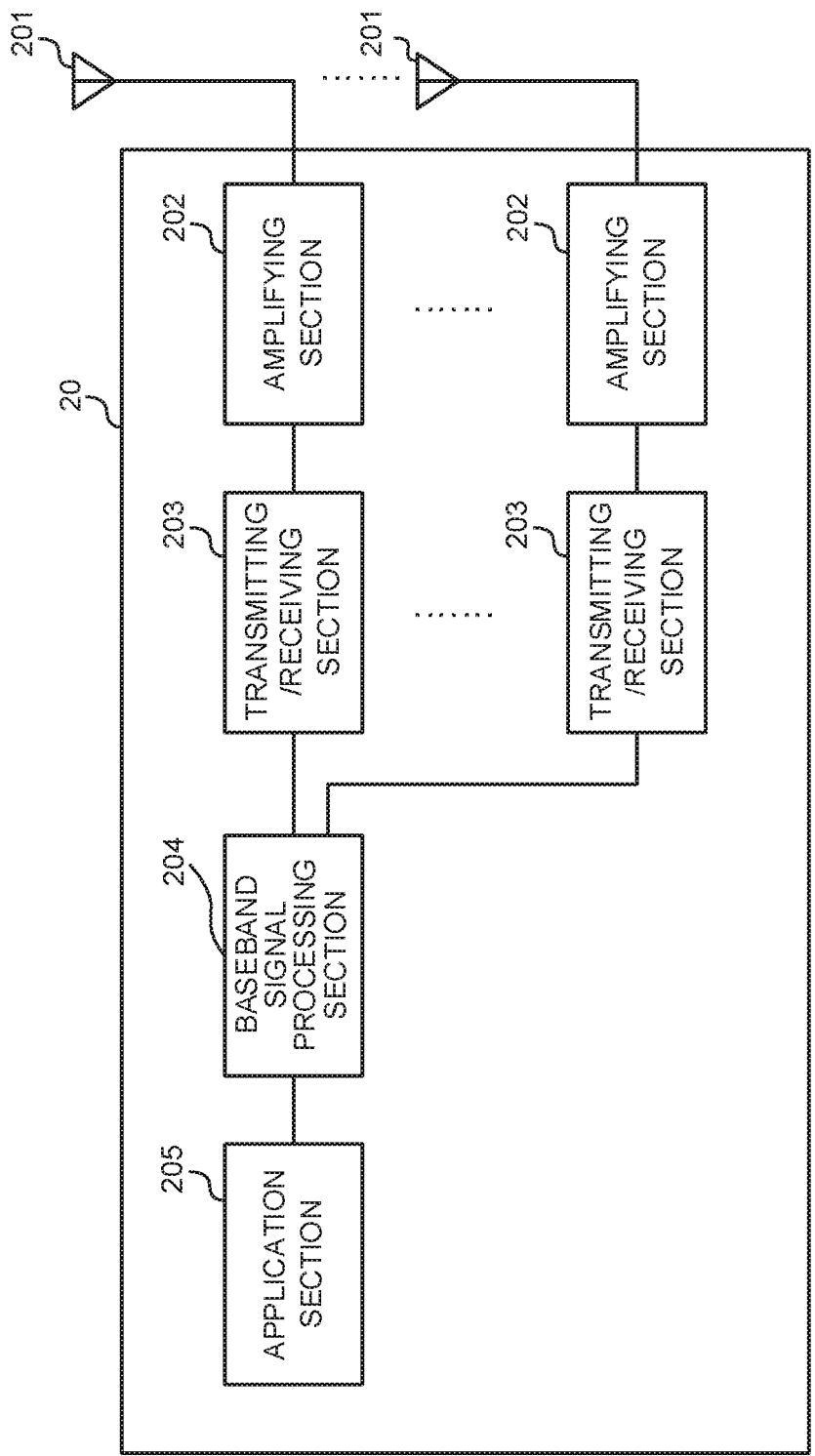
FIG. 13 is a diagram illustrating one example of an overall configuration of a user terminal according to the present embodiment.

FIG. 13 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205. The user terminal 20 may compose a "transmission apparatus" on UL, and compose a "reception apparatus" on DL.

The respective amplifying sections 202 amplify radio frequency signals received at a plurality of transmission/reception antenna 201. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs at least one of FFT processing, error correcting decoding, and reception processing of retransmission control on the input baseband signal. The baseband signal processing section 204 transfers DL data to the application section 205. The application section 205 performs processing related to layers higher than a physical layer and an MAC layer.

On the other hand, the application section 205 inputs UL data to the baseband signal processing section 204. The baseband signal processing section 204 performs at least one of retransmission control processing (e.g., HARQ processing), channel coding, rate matching, puncturing, Discrete Fourier Transform (DFT) processing and IFFT processing on the UL data, and transfers the UL data to each transmission/reception section 203. The baseband signal processing section 204 performs at least one of channel coding, rate matching, puncturing, DFT processing and IFFT processing on UCI (e.g., at least one of A/N of a DL signal, Channel State Information (CSI) and a Scheduling Request (SR)), too, and transfers the UCI to each transmission/reception section 203.

Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives a DL signal (e.g., at least one of a DL control signal (also referred to as a DL control channel or DCI), a DL data signal (also referred to as a DL data channel or DL data) and a reference signal). Furthermore, each transmission/reception section 203 transmits a UL signal (e.g., at least one of a UL control signal (also referred to as a UL control channel or UCI), a UL data signal (also referred to as a UL data channel or UL data) and a reference signal).

Furthermore, each transmission/reception section 203 may transmit the first UCI and/or the first UL data (e.g., the UCI/UL data for eMBB (or URLLC)) by using the first UL data channel (e.g., the PUSCH for eMBB (or URLLC)), and/or transmit the second UCI and/or the second UL data (e.g., the UCI/UL data for URLLC (or eMBB)) by using the second UL data channel (e.g., the PUSCH for URLLC (or eMBB)).

The transmission/reception sections 203 can be composed as transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 14:
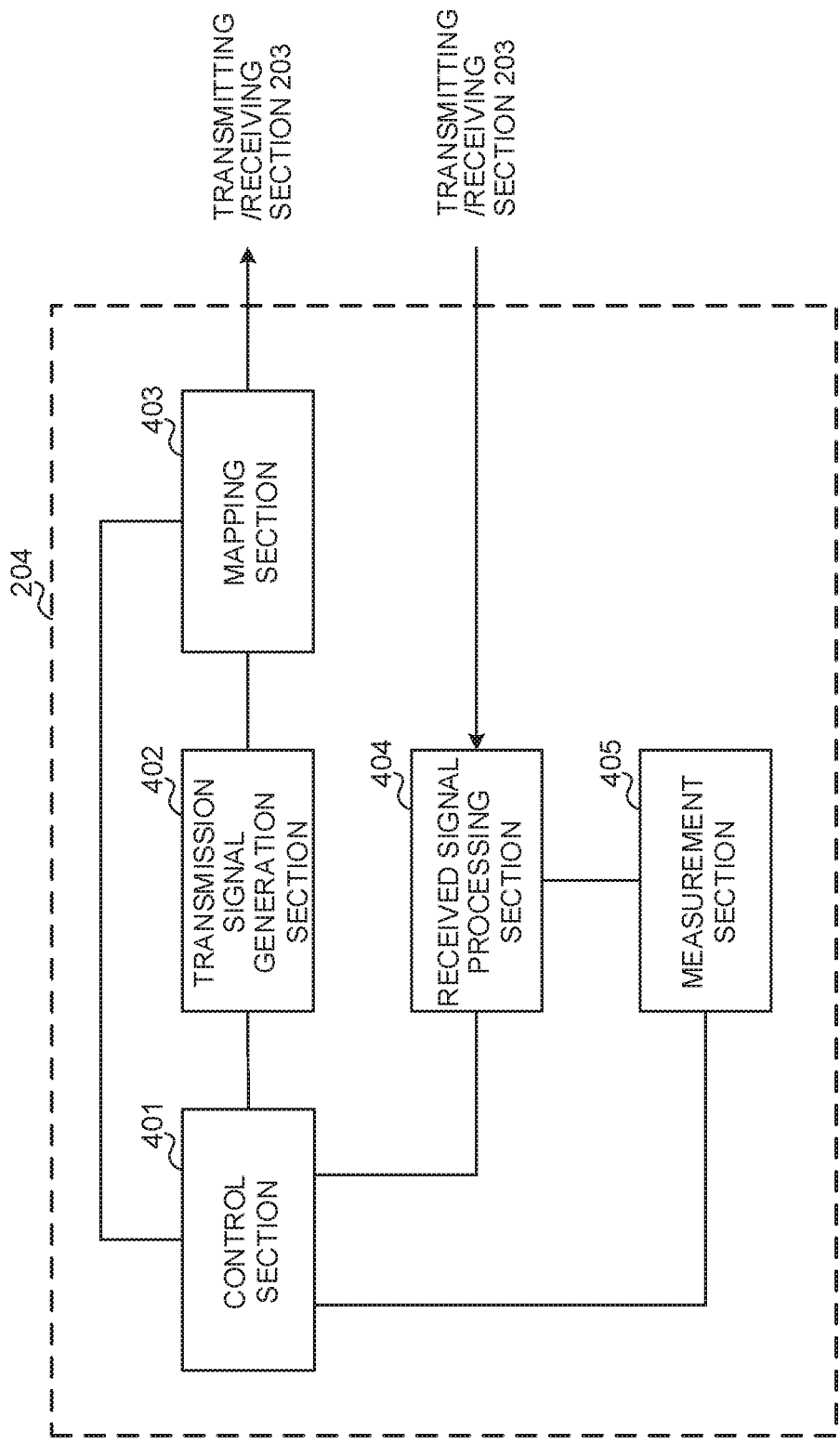
FIG. 14 is a diagram illustrating one example of a function configuration of the user terminal according to the present embodiment.

FIG. 14 is a diagram illustrating one example of a function configuration of the user terminal according to the present embodiment. In addition, FIG. 14 mainly illustrates function blocks of characteristic portions according to the present embodiment, and assumes that the user terminal 20 includes other function blocks, too, that are necessary for radio communication. As illustrated in FIG. 14, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls at least one of, for example, UL signal generation of the transmission signal generating section 402, UL signal mapping of the mapping section 403, DL signal reception processing of the received signal processing section 404 and measurement of the measurement section 405.

More specifically, the control section 401 may monitor (blind-decode) the DL control channel (e.g., CORESET), and detect DCI (e.g., at least one of a UL grant, a DL assignment and group DCI) for the user terminal 20.

The control section 401 may control transmission of the UL data channel based on the DCI or may control (UL grant-free) transmission of the UL data channel without being based on the DCI. Furthermore, the control section 401 may control transmission of UCI/UL data when one or more carriers are configured.

Furthermore, when at least part of the scheduled duration of the second UL data channel overlaps the transmission timing of the first UCI and/or the first UL data, the control section 401 may control transmission of the first UCI and/or the first UL data (first aspect).

When, for example, at least part of the scheduled duration of the second UL data channel (e.g., the PUSCH for URLLC) overlaps the transmission timing of the first UCI and/or the first UL data (e.g., the UCI/UL data for eMBB), the control section 401 may control at least one of dropping, puncturing and canceling of at least part of the first UCI and/or the first UL data (first collision control and FIGS. 1 to 3).

Furthermore, when at least part of the scheduled duration of the second UL data channel (e.g., the PUSCH for eMBB) overlaps the transmission timing of the first UCI and/or the first UL data (e.g., the UCI/UL data for URLLC), the control section 401 may control piggyback and/or replacement of the second UL data channel with respect to at least part of the first UCI and/or the first UL data (second collision control and FIGS. 4 to 7).

Furthermore, when at least part of the scheduled duration of the second UL data channel (e.g., the PUSCH for eMBB) overlaps the transmission timing of the first UCI and/or the first UL data (e.g., the UCI/UL data for eMBB), the control section 401 may control at least one of piggyback, replacement and/or canceling of the second UL data channel with respect to at least part of the first UCI and/or the first UL data (third collision control and FIG. 7).

Furthermore, the control section 401 may control the amount and/or the transmission power of the resource to be allocated to the first UCI or the second UCI based on which one of the first UCI and the second UCI is piggybacked on the first UL data channel or the second UL data channel (second aspect).

The control section 401 can be composed of a controller, a control circuit or a control apparatus described based on the common knowledge in the technical field according to the present invention.

The transmission signal generating section 402 generates (e.g., encodes, rate-matches, punctures and modulates) the above UL signal based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on a radio resource based on the instruction from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., at least one of demapping, demodulation and decoding) on the above DL signal. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 15:
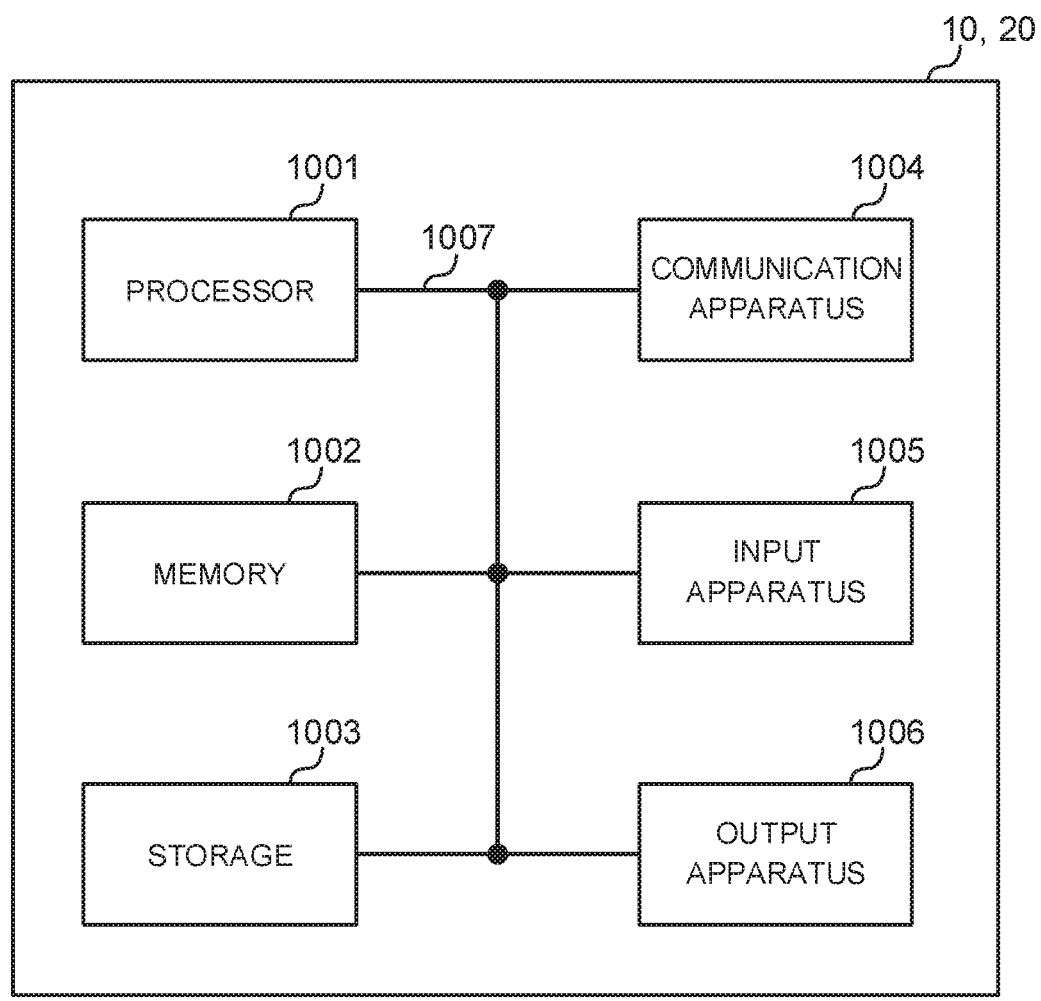
FIG. 15 is a diagram illustrating one example of hardware configurations of the radio base station and the user terminal according to the present embodiment.

For example, the radio base station and the user terminal according to the present embodiment may function as computers that perform processing of the radio communication method according to the present invention. FIG. 15 is a diagram illustrating one example of the hardware configurations of the radio base station and the user terminal according to the present embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 15 or may be configured without including part of the apparatuses.

For example, FIG. 15 illustrates the only one processor 1001. However, there may be a plurality of processors. Furthermore, processing may be executed by one processor or processing may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication of the communication apparatus 1004 and reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus illustrated in FIG. 15 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

The slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain.

The radio frame, the subframe, the slot, the mini slot and the symbol each indicate a time unit for carrying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms.

In this regard, the TTI refers to, for example, a minimum time unit of scheduling for radio communication. For example, in the LTE system, the radio base station performs scheduling for allocating radio resources (a frequency bandwidth and/or transmission power that can be used by each user terminal) in TTI units to each user terminal. In this regard, a definition of the TTI is not limited to this. The TTI may be a transmission time unit of a channel-coded data packet (transport block), or may be a processing unit of scheduling and/or link adaptation. In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe or a short subframe.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, the RB may be referred to as a Physical Resource Block (PRB: Physical RB), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the number of symbols included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to given values or may be expressed by other corresponding information. For example, a radio resource may be instructed by a given index. Furthermore, numerical expressions that use these parameters may be different from those explicitly disclosed in this description.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, "uplink" and/or "downlink" may be read as a "side". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of the physical and logical connections. It can be understood that, when used in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and non-comprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The invention claimed is:

1. A terminal comprising:
  a transmitter that transmits at least one of a physical uplink control channel based on a first priority parameter and a physical uplink shared channel based on a second priority parameter; and
  a processor that, when a scheduled duration of the physical uplink shared channel overlaps a transmission timing of the physical uplink control channel, cancels a transmission of the physical uplink control channel,
  wherein, when the scheduled duration of the physical uplink shared channel based on the second priority parameter overlaps a transmission timing of uplink control information based on the second priority parameter, the processor piggybacks the uplink control information on the physical uplink shared channel,
  wherein, when the scheduled duration of the physical uplink shared channel overlaps the transmission timing of the physical uplink control channel, the processor cancels the transmission of the physical uplink control channel after an overlapping duration, and
  wherein the second priority parameter has a higher priority than the first priority parameter.

2. A radio communication method for a terminal, comprising:
  transmitting at least one of a physical uplink control channel based on a first priority parameter and a physical uplink shared channel based on a second priority parameter; and
  when a scheduled duration of the physical uplink shared channel overlaps a transmission timing of the physical uplink control channel, canceling a transmission of the physical uplink control channel,
  wherein, when the scheduled duration of the physical uplink shared channel based on the second priority parameter overlaps a transmission timing of uplink control information based on the second priority parameter, the terminal piggybacks the uplink control information on the physical uplink shared channel,
  wherein, when the scheduled duration of the physical uplink shared channel overlaps the transmission timing of the physical uplink control channel, the transmission of the physical uplink control channel is canceled after an overlapping duration, and
  wherein the second priority parameter has a higher priority than the first priority parameter.

3. A system comprising a terminal and a base station, wherein
  the terminal comprises:
    a transmitter that transmits at least one of a physical uplink control channel based on a first priority parameter and a physical uplink shared channel based on a second priority parameter; and
    a processor that, when a scheduled duration of the physical uplink shared channel overlaps a transmission timing of the physical uplink control channel, cancels a transmission of the physical uplink control channel,
    wherein, when the scheduled duration of the physical uplink shared channel based on the second priority parameter overlaps a transmission timing of uplink control information based on the second priority parameter, the processor piggybacks the uplink control information on the physical uplink shared channel,
    wherein, when the scheduled duration of the physical uplink shared channel overlaps the transmission timing of the physical uplink control channel, the processor cancels transmission of the physical uplink control channel after an overlapping duration, and
    wherein the second priority parameter has a higher priority than the first priority parameter, and
  the base station comprises:
    a receiver that receives at least one of the physical uplink control channel and the physical uplink shared channel.

* * * * *